(12) United States Patent
Côté et al.

(10) Patent No.: US 8,681,768 B2
(45) Date of Patent: Mar. 25, 2014

(54) SYSTEM AND METHOD OF PACING REAL TIME MEDIA TRANSMISSION OVER A BROADBAND CHANNEL USING MICRO BURSTING

(75) Inventors: Sébastien Côté, Montreal (CA); Jean Mayrand, Chambly (CA)

(73) Assignee: Vantrix Corporation, Montreal, Quebec (CA)

( * ) Notice: Subject to any disclaimer, the term of this patent is extended or adjusted under 35 U.S.C. 154(b) by 280 days.

(21) Appl. No.: 13/229,964

(22) Filed: Sep. 12, 2011

(65) Prior Publication Data
US 2012/0069829 A1    Mar. 22, 2012

Related U.S. Application Data

(60) Provisional application No. 61/385,108, filed on Sep. 21, 2010.

(51) Int. Cl.
*H04W 88/08* (2009.01)
(52) U.S. Cl.
USPC ........................................................ 370/347
(58) Field of Classification Search
USPC ................. 370/230, 235, 347, 115, 351, 412; 725/62, 106
See application file for complete search history.

(56) References Cited

U.S. PATENT DOCUMENTS

| | | | |
|---|---|---|---|
| 7,130,283 B2 * | 10/2006 | Vogel et al. | 370/322 |
| 7,945,688 B1 * | 5/2011 | Lango et al. | 709/231 |
| 7,991,905 B1 * | 8/2011 | Roussos et al. | 709/231 |
| 2006/0067245 A1 * | 3/2006 | Pearl | 370/252 |
| 2006/0095943 A1 * | 5/2006 | Demircin et al. | 725/81 |
| 2007/0002871 A1 * | 1/2007 | Pekonen et al. | 370/395.42 |
| 2008/0090575 A1 * | 4/2008 | Barak et al. | 455/444 |
| 2008/0300975 A1 * | 12/2008 | Dawson et al. | 705/14 |
| 2011/0053657 A1 * | 3/2011 | Jl | 455/574 |

OTHER PUBLICATIONS

IEEE 802.11 (http://en.wikipedia.org/wiki/IEEE_802.11 Sep. 10, 2010.
Koenen, Rob "Overview of the MPEG-4 Standard" ISO/IEC JTC1/SC29/WG11 N4668, Mar. 20002.

* cited by examiner

*Primary Examiner* — Chandrahas Patel
*Assistant Examiner* — Lan Huong Truong
(74) *Attorney, Agent, or Firm* — Victoria Donnelly; IP-MEX Inc.

(57) ABSTRACT

A wireless system for streaming media files includes a microburst gateway in which microbursts, comprising groups of buffered packets of the streamed media, are transmitted periodically to a user over a broadband channel over respective window periods, the bursts being transmitted at a higher than an average packet rate associated with the media file. At the start of each fairly long window period of 500 ms, for example, one microburst is sent over the broadband channel, leaving the remainder of the window period available for other users. The window period and a number of packets in the burst within the window period are defined so that the average packet rate is substantially maintained. A corresponding microburst gateway and a method for transmitting the media file are also provided.

35 Claims, 9 Drawing Sheets

Fig. 6

SYSTEM AND METHOD OF PACING REAL TIME MEDIA TRANSMISSION OVER A BROADBAND CHANNEL USING MICRO BURSTING

CROSS REFERENCE TO RELATED APPLICATIONS

This application claims priority from U.S. provisional application 61/385,108 filed on Sep. 21, 2011 for "System and Method of Pacing Real Time Media Transmission over a Broadband Channel using Micro Bursting", entire contents of which are incorporated herein by reference.

FIELD OF THE INVENTION

The present invention relates to the wireless transmission of real time media, and in particular to a system and method for pacing real time media transmission over a broadband channel using micro bursting.

BACKGROUND OF THE INVENTION

Figure 1:
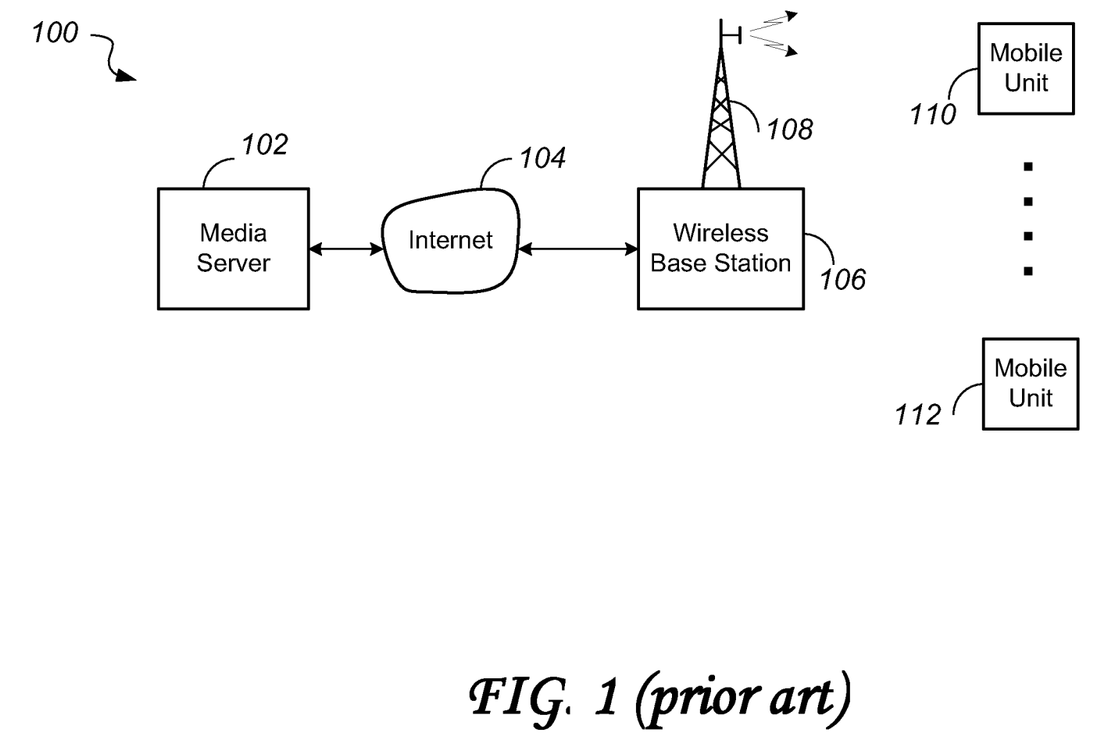
FIG. 1 shows a wireless transmission system 100 of the prior art.

FIG. 1 shows a wireless transmission system 100 of the prior art, including a media server 102 which is connected over an internet 104 to a wireless base station 106, which is coupled to an antenna 108 for communication with wireless mobile units 110 and 112 over wireless broadband channels 114 and 116 respectively.

Modern wireless services such as Third Generation (3G), Worldwide Interoperability for Microwave Access (WiMAX), and WiFi using IEEE 802.11 family of standards provide an on-demand broadband channel for carrying data packets between the wireless base station 106 and a mobile unit 110, which may, for example, be a smart phone or a laptop computer.

The wireless base station 106 may be connected over the internet 104 to servers, including the media server 102.

A media session may be requested by the mobile unit 110. The purpose of the media session is to send a stream of media packets (a media file) from the media server 102 to the mobile unit 110 via the wireless base station 106.

The media session is carried in a virtual connection between the media server 102 and the mobile unit 110, according to a standard protocol, for example the Hypertext Transfer Protocol (HTTP), protocol data units (PDUs) of this higher level protocol being in turn carried over the Transmission Control Protocol (TCP). The media server 102 transmits the media packets to the wireless base station 106 over the internet 104. The wireless base station 106 allocates an available broadband wireless channel to the mobile unit 110, and forwards the media packets to the mobile unit 110.

The transmission rate of the media packets may be throttled such that sufficient data is available at the mobile unit 110 to display the media, for example, audio or video, in real time without excessive buffering.

When the bandwidth of the wireless channel is greater, perhaps much greater, than the bandwidth required to send the throttled media packets in real time, a large amount of the wireless resource, i.e. of the allocated channel, may be wasted.

Accordingly, a method and system to improve the efficiency in the use of the wireless broadband channel are required.

SUMMARY OF THE INVENTION

There is an object of the invention to provide an improved system and method for transmitting a media file from a media server to a mobile unit.

According to one aspect of the invention, there is provided a microburst gateway for transmitting a media file over a transmission channel having excess bandwidth, the microburst gateway comprising:
a processor and a computer readable storage medium having computer readable instructions stored thereon for execution by the processor, forming:
 a packet buffer, receiving and storing data packets of the media file; and
 a microburst controller, controlling transmission of the data packets stored in the packet buffer in bursts, recurring over respective window periods, at a higher than an average packet rate, the average packet rate being associated with the media file, each window period comprising a burst duration time during which a burst is transmitted and a remaining idle time, the window period and a number of packets in the burst within the window period being defined so that the average packet rate is substantially maintained.

The average packet rate is a function of a profile of the media file.

The microburst gateway further comprises:
 a server interface, receiving the media file from a source; and
 a network interface, sending the bursts over the transmission channel to a destination.

In the embodiments of the invention, the source is a server computer, and the destination is a wireless base station serving a mobile unit over a broadband wireless channel, and the microburst gateway may be contained within the media server computer or within a wireless base station.

The microburst controller is further configured to determine duration of a window period and a packet count limit for the window period, and the microburst gateway further comprises:
 a packet counter, counting a number of packets sent from the packet buffer; and
 a packet gate module, limiting the number of packets sent in each window period not to exceed the packet count limit.

The microburst gateway further comprises a window timer for timing the window period. In the embodiments of the invention, the duration of the window period is in a range from about 100 ms to about 1000 ms. Conveniently, the idle time is at least 50% of the window period, and the excess bandwidth is at least twice of the bandwidth required for carrying the data packets.

In the embodiments of the invention, the duration of the window period is further limited by one or more of the following:
 a buffer capacity in a receiver receiving the media file; or
 a connection timeout value associated with a protocol used for transmitting the data packets; or
 a desired maximum delay for a real time delivery of the media file to the receiver; or
 a minimum hold-over period of the transmission channel after cessation of a burst transmission, the duration of the window period being selected so that the idle time is substantially longer than the minimum hold-over period.

For example, the minimum hold-over period may be about 10 ms.

In the microburst gateway described above, the data packets in each burst are continuous and transmitted using a full bandwidth of the transmission channel.

The data packets in each burst are protocol data units of a standard transmission protocol, for example, a Transmission Control Protocol (TCP) or another protocol.

According to yet another aspect of the invention, there is provided a system for transmitting a media file over a transmission channel having excess bandwidth, comprising:
  (a) a microburst gateway for transmitting a media file over a transmission channel having excess bandwidth, the microburst gateway comprising:
    a processor and a computer readable storage medium having computer readable instructions stored thereon for execution by the processor, forming:
      (i) a packet buffer, receiving and storing data packets of the media file; and
      (ii) a microburst controller, controlling transmission of the data packets stored in the packet buffer in bursts, recurring over respective window periods, at a higher than an average packet rate, the average packet rate being associated with the media file, each window period comprising a burst duration time during which a burst is transmitted and a remaining idle time, the window period and a number of packets in the burst within the window period being defined so that the average packet rate is substantially maintained; and
  (b) a wireless base station for providing the transmission channel, which is a wireless broadband channel according to a wireless standard for mobile users.

The system of the embodiments of the invention operates according to the wireless standard, which is one of Second Generation (2G), Third Generation (3G), Fourth Generation (4G) net-works standards, Long Term Evolution (LTE), LTE Advanced, Worldwide Interoperability for Microwave Access (WiMAX), and Wi-Fi.

The system further comprises an Internet connection between the microburst gateway and the wireless base station. The wireless base station may also include a satellite.

Conveniently, the system may be configured so that the wireless base station transmits other data in the wireless broadband channel during the idle time.

In the system described above, the wireless broadband channel has sufficient bandwidth required for carrying the data packets, plus an excess bandwidth.

Conveniently, the idle time is sufficiently long to carry another burst associated with another media file.

According to another aspect of the invention, there is provided, in a microburst gateway for transmitting a media file over a transmission channel having excess bandwidth, comprising a packet buffer receiving and storing data packets of the media file, a processor and a memory having computer readable instructions stored thereon for execution by the processor:
  a microburst controller controlling transmission of the data packets stored in the packet buffer in bursts, recurring over respective window periods, at a higher than an average packet rate, the average packet rate being associated with the media file, each window period comprising a burst duration time during which a burst is transmitted and a remaining idle time, the window period and a number of packets in the burst within the window period being defined so that the average packet rate is substantially maintained; and
  a packet gate module for limiting the number of packets sent in each window period not to exceed a packet count limit.

According to yet another aspect of the invention, there is provided a method for transmitting a media file over a transmission channel having excess bandwidth, comprising:
  (a) storing data packets of the media file in a packet buffer for transmission over the transmission channel in bursts of packets;
  (b) defining a window period having a burst duration time during which a burst is transmitted and a remaining idle time, and a packet count limit limiting a number of packets in the burst within the window period so that an average packet rate associated with the media file is maintained;
  (c) starting a window timer for timing the window period;
  (d) sending a burst of buffered data packets from the packet buffer to a destination during the burst duration time at a higher than the average packet rate, the number of packets in the burst being limited by the packet count limit;
  (e) waiting for the window timer to time out; and
  (f) restarting the window timer, and repeating the steps (d) and (e) until the packet buffer is empty.

The method further comprises repeating the steps (a) and (f) until the media file is transmitted.

The method further comprises:
  receiving the media file from a server computer, the step being performed before the step (a); and
  wherein the step (d) comprises sending to the destination, which is a wireless base station serving a mobile unit over a broadband wireless channel.

In the method described above, the step (b) comprises defining the window period, which is in a range from about 100 ms to about 1000 ms.

In the method described above, the step (b) further comprises defining the window period, which is further limited by one or more of the following:
  a buffer capacity in a receiver receiving the media file; or
  a connection timeout value associated with a protocol used for transmitting the data packets; or
  a desired maximum delay for a real time delivery of the media file to the receiver; or
  a minimum hold-over period of the transmission channel after cessation of a burst transmission, the window period being selected so that the idle time is substantially longer than the minimum hold-over period.

Conveniently, the minimum hold-over period may be about 10 ms.

In the method described above, the step (d) comprises sending so that the data packets in each burst are continuous and transmitted using a full bandwidth of the transmission channel.

The step (d) comprises sending the data packets in each burst according to a standard transmission protocol, for example, according to a Transmission Control Protocol (TCP) or another protocol.

In the embodiments of the invention, the step (b) comprises defining the idle time, which is at least 50% of the window period. In the method described above, the excess bandwidth is at least twice of the bandwidth required for carrying the data packets.

The method further comprises providing the transmission channel, which is a wireless broadband channel according to a wireless standard for mobile users, for example, Second Generation (2G), Third Generation (3G), Fourth Generation (4G) networks standards, Long Term Evolution (LTE), LTE Advanced, Worldwide Interoperability for Microwave Access (WiMAX), and Wi-Fi.

According to yet one more aspect of the invention, there is provided a method for transmitting a media file over a transmission channel having excess bandwidth, the method comprising:

at a packet buffer, receiving and storing data packets of the media file; and employing a processor for controlling transmission of the data packets stored in the packet buffer in bursts, recurring over respective window periods, at a higher than an average packet rate, the average packet rate being associated with the media file, each window period comprising a burst duration time during which a burst is transmitted and a remaining idle time, the window period and a number of packets in the burst within the window period being defined so that the average packet rate is substantially maintained.

Thus, an improved system and method for transmitting a media file in the form of periodic short bursts of data packets from a media server to a mobile unit have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 2:
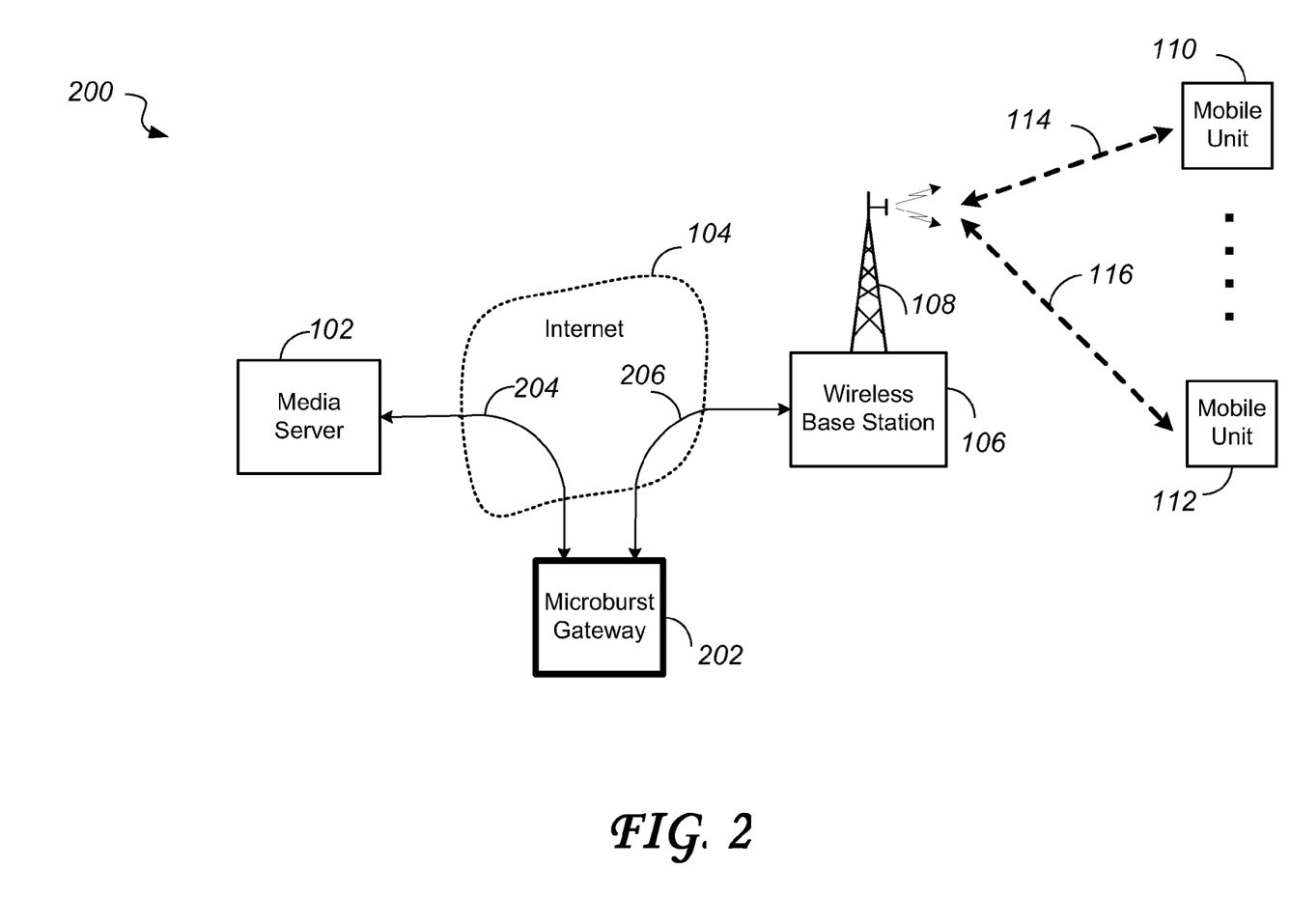
FIG. 2 shows a wireless media delivery system 200 according to an embodiment of the invention.

FIG. 2 shows a wireless media delivery system 200 according to an embodiment of the invention, based on the wireless transmission system 100, but including a Microburst Gateway 202 which is connected to the media server 102 and the wireless base station 106 through the internet 104. The Microburst Gateway 202 receives media files from the media server 102 over a media connection 204 through the internet 104. The Microburst Gateway 202 communicates with the wireless base station 106 over an internet connection 206.

Alternatively, the Microburst Gateway 202 may be co-located with the media server 102 in which case the media connection 204 may be over a local link.

Higher wireless efficiency is achieved by intercepting a media file through the Microburst Gateway 202 according to a method of the invention, which requires no changes in the wireless base station 106 or the mobile unit 110, and makes use of existing internet protocols, preferably HTTP.

Rather than keeping the allocated wireless channel to the mobile unit 110 open for the duration of a transfer (a call), the transfer is accomplished in periodic short bursts (termed "microbursts"). Each microburst is followed by a comparatively long pause that allows the base station to release the broadband channel between microbursts.

At the start of a media transmission according to the invention, an HTTP session which includes a TCP connection between the mobile unit 110 and the media server 102 is set up. Based on the need for packets to flow upstream and downstream, the wireless base station 106 will allocate wireless broadband channels. This includes a broadband download channel of a mobile bandwidth of "X" Mb per second to the mobile unit 110. The mobile bandwidth "X" is a fraction of a total wireless bandwidth "Z", measured as Mb per second, that is available at the wireless base station 106 to be shared with all mobile units that are currently accessing the wireless base station.

Typically when there is no packet to transmit for more than about 10 ms hold-over period the broadband download channel will be de-allocated by the wireless base station 106 and may be assigned to another user.

A throttling window of a fixed window period W, for example W=500 ms, may be selected in the Microburst Gateway 202, the window period "W" being selected statically based on the con-figuration of the hold-over time in the base station.

In the embodiments of the invention, the duration of the window period is in a range from about 100 ms to about 1000 ms. The actual hold-over period is determined by a channel management function of the wireless base station 106, as defined in an applicable specification for the wireless base station 106. The hold-over period may be assumed to be typically 10 ms, and may range from 1 to 50 ms, depending on wireless base station design.

An average bandwidth "A" (Mb per second) that is required for transmitting the given media is determined in the media server when an HTTP streaming session is setup, by analyzing dynamically the bandwidth required to play back the media in real time. Information regarding the average bandwidth "A" is available from the profile of the media file, including visual profile, audio profile, graphics profile, scene graph profile MPEG-J profile et al., and can be obtained during the HTTP streaming session setup.

A copy of the MPEG4 standard, which is a standard for video coding, is available from http://mpeg.chiariglione.org/standards/mpeg-4/mpeg-4.htm. The MPEG4 standard is only one of several standards for the encoding of media files, each standard providing one or more media profiles thus providing for average bandwidth figures for specific media types and coding levels.

The present invention takes advantage of the case where the average bandwidth "A" is less, and preferably significantly less than the mobile bandwidth "X". From the average bandwidth information, a number "P" of packets, each carrying "p" bytes of the media file in each throttling window of period "W", may be determined as follows:

The total number of bits per throttling window period that can be carried in the broadband download channel is:

$$y = X * W.$$

The number of bits required to transmit a portion of the media in the window period W:

$$a = A * W, \text{ where "}a\text{" may be much less than "}y\text{".}$$

The corresponding number of packets P, that is, a set of media packets, each carrying p*8 bit, in a window period "W" is:

$$P=a/(p*8).$$

The media file is transmitted by the Media Server 102 in the form of media packets over the media connection 204 at the average bandwidth "A". The Media Server 102 does not need to be aware of the presence of the Microburst Gateway 202, which buffers the media packets and releases them in sets of "P" media packets to be transmitted in bursts at a speed corresponding to the mobile bandwidth "X" of the wireless broadband download channel over the internet connection 206.

When a first set of media packets has been transmitted by the Microburst Gateway 202, the Microburst Gateway 202 will pause for the rest of the window period W. Each set of media packets (P packets) is transmitted as fast as the network allows it. The term "microburst" will be used herein to denote a set of "P" media packets. When the microburst reaches the base station 106 a broadband download channel will be allocated by the base station 106 to deliver the packets to the mobile unit 110. Once all the packets of a microburst have reached the mobile unit 110, and no more packets are available for the mobile unit 110, the base station will de-allocate the broadband download channel after a short hold-over period "To", for example "To"=10 ms, the hold-over period "To" being a configured property of the wireless base station 106 and may be shorter or longer than 10 ms. The wireless base station 106 is now free to allocate the wireless broadband channel to another user, that is, the remainder of the throttling window after the microburst has been delivered, is available for the total bandwidth "X" of the wireless broadband channel to be used now in other transmissions (to other mobile units, including the mobile unit 112 for example).

At the start of each window period W, a new set of "P" packets, i.e. another microburst, is sent by the Microburst Gateway 202, and the base station 106 will allocate a fresh wireless broadband download channel. A microburst of "P" packets is then transferred from the Microburst Gateway 202 to the mobile unit 110, after which the wireless download channel is released again by the wireless base station 106.

The Microburst Gateway 202 may be independently and simultaneously serving connections to multiple mobile units (110, 112, etc.) at the same time. A staggered set of windows, each of the length of window period W, for example may be managed independently on a per connection basis, to provide an interleaved set of microbursts.

Figure 2A:
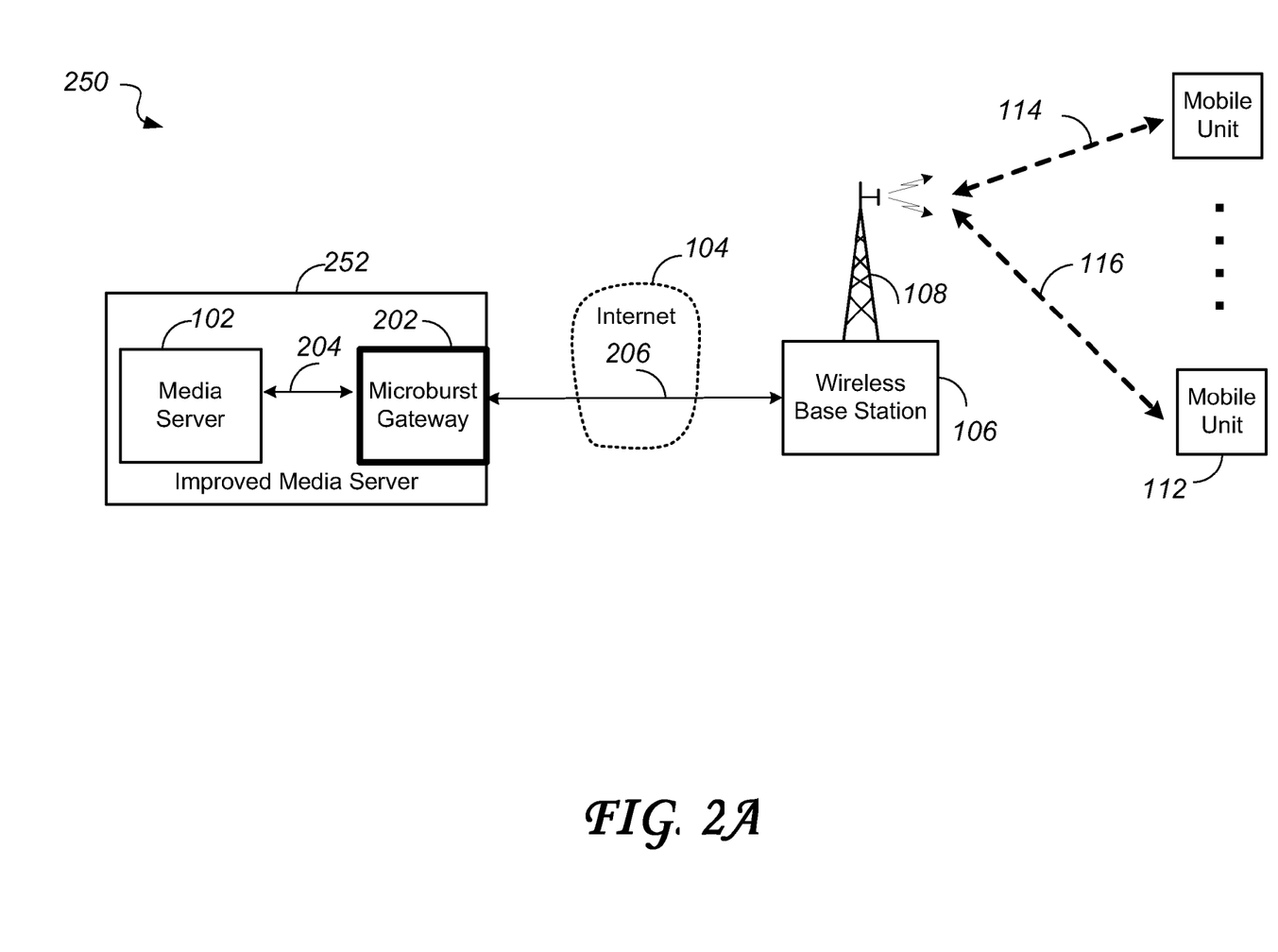
FIG. 2A shows a modified wireless media delivery system 250 which is a variation of the wireless media delivery system 200.

FIG. 2A shows a modified wireless media delivery system 250 which is a variation of the wireless media delivery system 200. In the modified wireless media delivery system 250, the Microburst Gateway 202 and the Media Server 102 are combined into an Improved Media Server 252. The modified wireless media delivery system 250 resembles the wireless media delivery system 200, and provides the same functionality. The media connection 204 does not run over the internet 104 but is provided locally within the Improved Media Server 252.

Figure 2B:
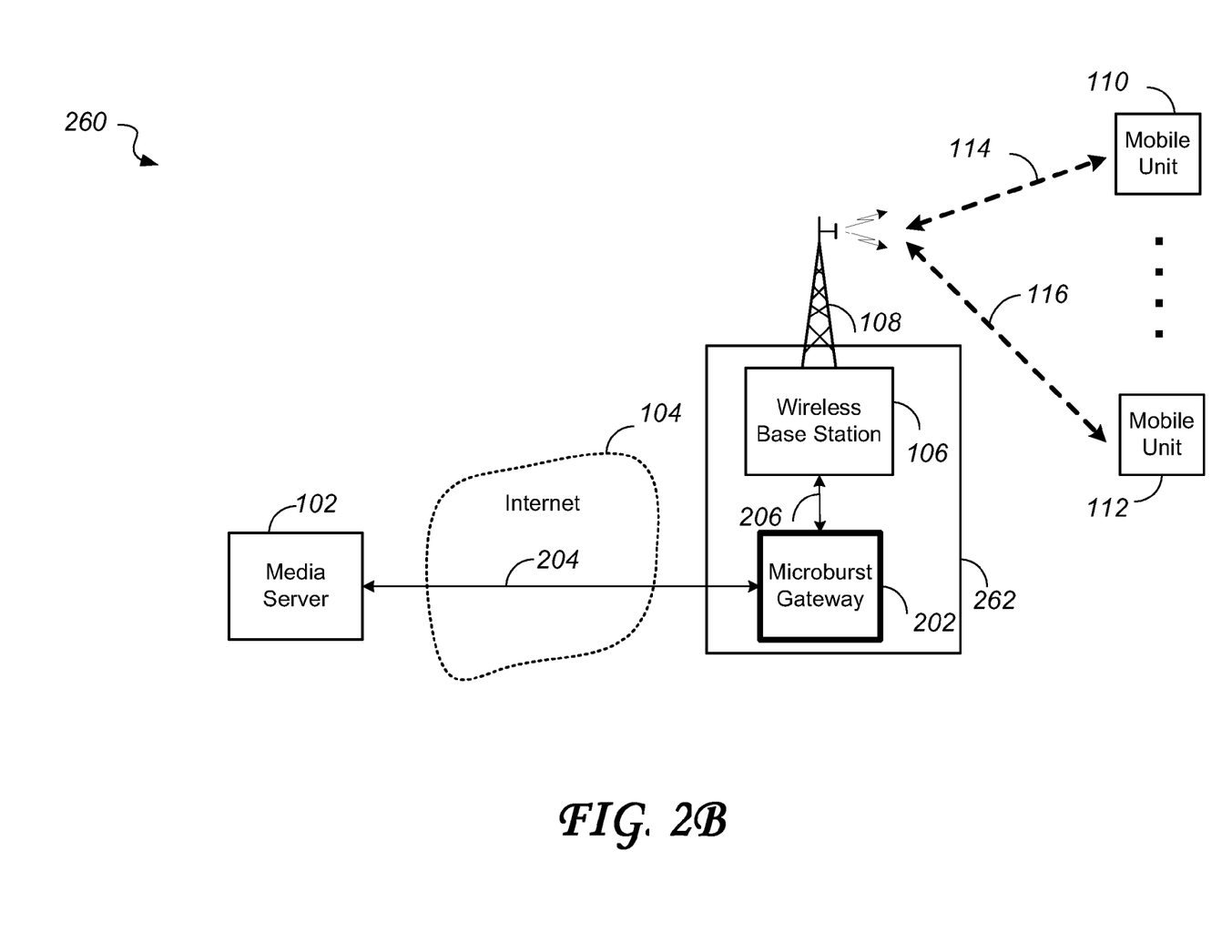
FIG. 2B shows another modified wireless media delivery system 260 which is a variation of the wireless media delivery system 200.

FIG. 2B shows another, second modified wireless media delivery system 260 which is a variation of the wireless media delivery system 200. In this second modified wireless media delivery system 260, the Microburst Gateway 202 and the wireless base station 106 are combined into an improved wireless base station 262. This second modified wireless media delivery system 260 resembles the wireless media delivery system 200, and provides the same functionality. The media connection 206 does not run over the Internet 104, but is provided locally within the improved wireless base station 262.

Figure 3:
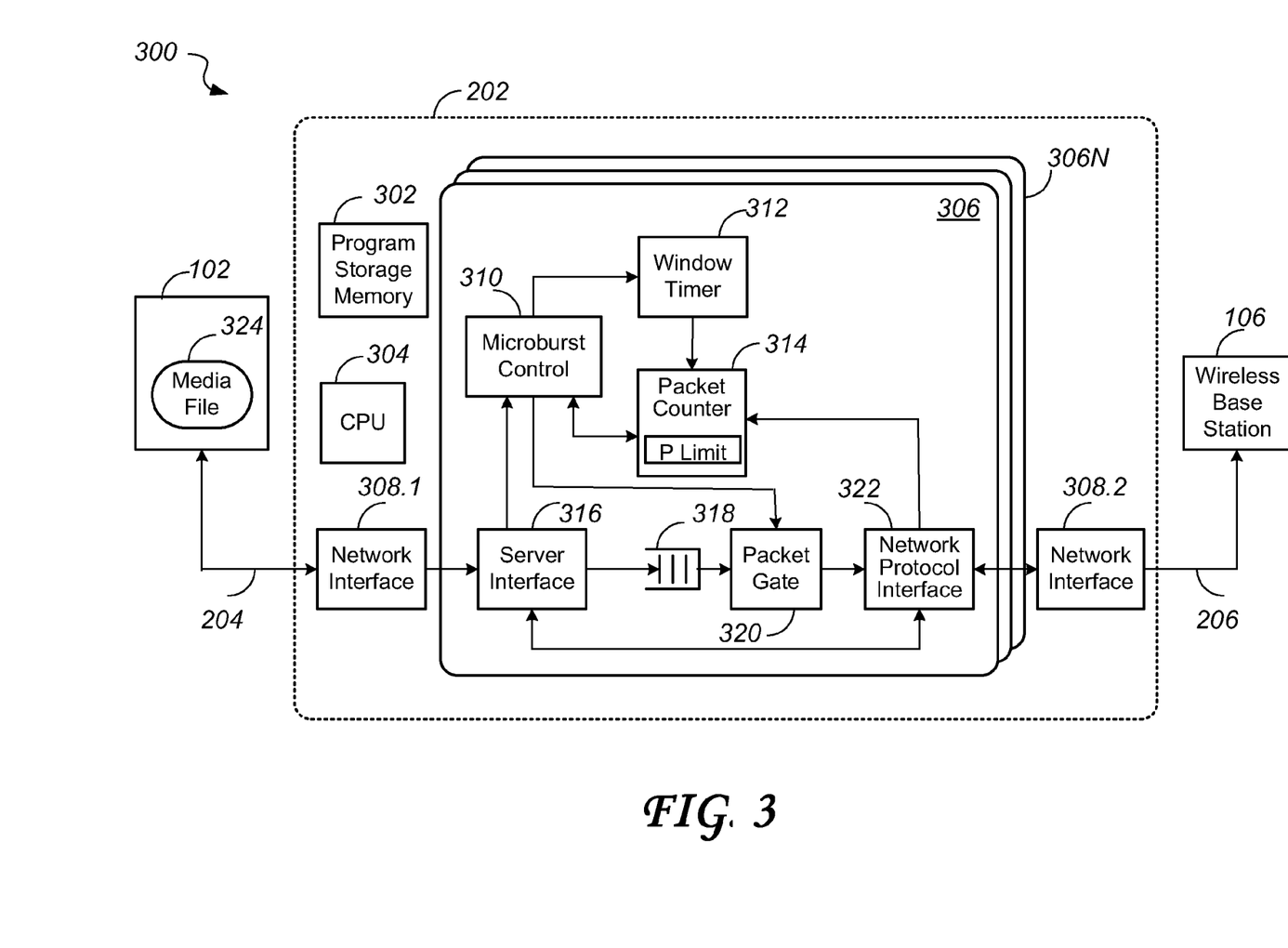
FIG. 3 is an exemplary software implementation diagram 300 of the wireless media delivery system 200 of FIG. 2.

FIG. 3 is an exemplary software implementation diagram 300 of the wireless media delivery system 200 of FIG. 2, showing the Media Server 102 and the Wireless Base Station 106, as well as a detailed illustration of the Microburst Gateway 202, which includes at a minimum a program storage memory 302, a central processing unit (CPU) 304 for executing software program instructions of a microburst process 306, a program storage memory 302 for storing the program modules for the microburst process 306, and a network interface 308, shown as two network interface instances 308.1 and 308.2 for interfacing the media connection 204 and the internet connection 206 respectively.

The microburst process 306 comprises computer readable instructions stored in a computer readable storage medium such as the Program Storage Memory 302, for execution by a processor such as the CPU 304.

In one embodiment, the Microburst Gateway 202 comprises computer readable instructions stored in a computer readable storage medium such as memory for execution by a general purpose or specialized processor. Alternatively, the Microburst Gateway 202 may be implemented in firmware.

Software program instructions of the microburst process 306 are found in the following program modules: a microburst control module 310, a window timer 312, a packet counter 314, a server interface 316, a packet buffer 318, a packet gate module 320, and a Network Protocol Interface 322, each of these modules comprising non-transitory computer readable storage medium such as memory storing computer readable instructions for execution by a general purpose or a specialized processor.

Additional instances 306N of the microburst process 306 may be created as needed, to serve additional mobile units which may be receiving the same or different media files over the same or different wireless base stations, preferably using the same window size although the individual windows do not need to be synchronized.

In operation, a media file 324 from the media server 102 is received by the server interface 316 over the media connection 204 and the first network interface 308.1, and is buffered in the packet buffer 318. The capacity of the packet buffer 318 may be as large as an entire media file, but is preferably not much larger than is needed to buffer the packets of a few microbursts, given a selected window period W, because it may be assumed that sending the microbursts will be draining the buffer faster than the media server can fill it. The packet buffer 318 may be conventionally implemented.

The microburst control module 310 determines the parameter "W" defining the window period W, and programs the window timer 312 accordingly, i.e. restarts the window timer 312 at the beginning of each window period. The microburst control module 310 further determines the number of packets "P" that will be sent in each microburst, and stores the value of "P" in a "P Limit" register of the packet counter. The microburst control module 310 may obtain any necessary profile information of the media file that is available during the streaming session setup, by accessing the Server Interface 316. From the media file profile which includes information on the average bit rate of the media file, the average packet rate is calculated by the microburst control module 310 as described above.

At the start of each burst window period, the packet counter 314 is cleared by the window timer 312, and the packet gate module 320 is enabled by the microburst control module 310.

Buffered packets of the media file 324 are transmitted from the packet buffer 318 through the packet gate module 320 to the Network Protocol Interface 322 and delivered via the second network interface 308.2 over the internet connection 206 to the wireless base station 106, and so ultimately to the mobile unit 110. The network protocol utilized and provided by the Network Protocol Interface 322 is preferably the standard Transmission Control Protocol (TCP), although other protocols are also envisaged. The Network Protocol Interface 322 provides an indication to the packet counter 314 for each packet that has been sent. Transmitted packets are counted in the packet counter 314, and when the number of packets reaches the packet limit P, i.e. one microburst has been sent, the microburst control module 310 is informed by the packet counter 314 and the packet gate module 320 is disabled so that no further packets are sent out, until the next window period "W" starts.

When the window period "W" expires, as determined by the window timer 312, another window period is started: the window timer 312 starts counting the next window period, the packet counter 314 is cleared, and the packet gate module 320 is enabled to allow up to "P" packets to be sent again. The window period is thus composed of a burst duration time and an idle time. The burst duration time ends after "P" packets have been sent or, in the start-up phase as well as the finishing phase, when the packet buffer 318 is empty.

Preferably, the idle time is at least 50% of the window period, and the excess bandwidth is at least twice of the bandwidth required for carrying the data packets.

In the start-up phase, transmission of microbursts preferably begins as soon as any number of packets, for example just the first packet of the media file have arrived in the packet buffer 318. The first, or the first few microbursts of the start-up phase may then contain fewer than "P" packets because the packet buffer 318 is being filled with packets from the Server Interface 316 at a lower rate than it is drained by the Packet Gate 320. When as a result the packet buffer 318 is temporarily empty and no packets are available to continue the microburst, the microburst is ended and the system waits for the next window period to start, i.e. the idle time. As the buffer continues to fill during the idle time, the next microburst will have more packets available and so on, until either equilibrium is achieved. Similarly, in the finishing phase, less than "P" packets may be left in the packet buffer 318 for the last microburst.

The average rate of packets arriving from the media server 102 should ideally at least slightly exceed the rate of packet transmission in the microbursts. By the same token, it is also possible to ingest the entire media file 324 in the packet buffer 318 at much higher speed, but that would require a much larger capacity of the packet buffer 318. Transmission to the mobile unit 110 is then still controlled by the Microburst Gateway 202 to match the average bandwidth that was determined in the HTTP streaming session setup.

Figure 4:
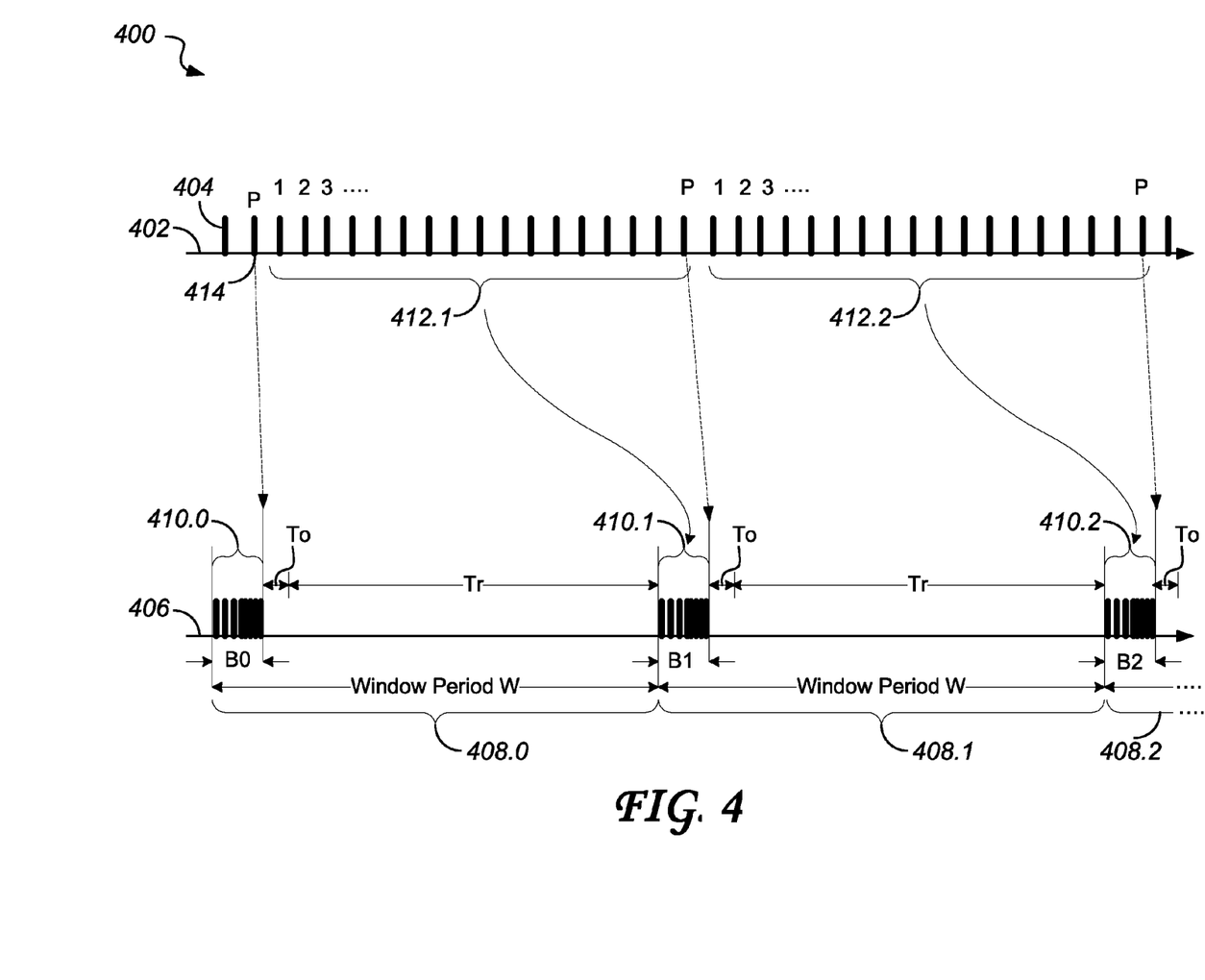
FIG. 4 shows a simplified timing diagram 400, including an input timeline 402 illustrating a flow of data packets 404 entering the Microburst Gateway 202 of FIG. 2 and an output timeline 406 illustrating corresponding throttling windows 408.

FIG. 4 shows a simplified timing diagram 400, including an input timeline 402 illustrating an exemplary flow of data packets 404 entering the Microburst Gateway 202 on the media connection 204 and an output timeline 406 illustrating corresponding throttling windows 408.i, each throttling window 408.i containing a corresponding microburst 410.i of duration "$T_b$", i=0 to 2. Only two complete throttling windows 408.0 and 408.1 and a partially shown throttling window 408.2 are shown in FIG. 4. It is understood that the timing diagram 400 shows only representative and exemplary sections of the timelines 402 and 406 for the purpose of describing the embodiment of the invention in greater detail.

Data packets 404, representing the content of the media file 324 arrive at the Microburst Gateway 202 from the media server 102, at an average rate corresponding to the average bandwidth "a" that is sufficient to support the real time display of the media file 324 in the mobile unit 110 as described earlier. Approximately "P" packets arrive in each window period "W" of the throttling windows 408. This is illustrated in packet sequences 412.1 and 412.2 each of which includes "P" packets as indicated by sequence numbers 1, 2, 3, . . . P.

While the actual number of arriving packets in each window period "W" may vary considerably and is consequently buffered in the packet buffer 318, the average number of packets per window period "W" will be "P". Each group of "P" packets is forwarded into a microburst 410, the packet sequence 412.1 as the microburst 410.1 of the throttling window 408.1, and the packet sequence 412.2 as microburst 410.2 of the throttling window 408.2. The arrival of the last packet, i.e. the "P"-th packet 414, of a previous packet sequence 412.0 (which is not shown in FIG. 4) completes the set of packets of the microburst 410.0 of the throttling window 408.0.

A microburst duration Bi (B0 to B2), shown in FIG. 4 to indicate the duration of each microburst 410.i, is a function of the number of packets "P", and the actual bandwidth available to transmit the "P packets of the microburst to the mobile unit 110 over the internet connection 206 to the wireless base station 106. The microburst duration Bi is further affected by the action of the transmission protocol used on the internet connection 206, for example TCP. Because the TCP connection is suspended after each microburst and then resumed at the start of the next microburst, the TCP windowing mechanism causes the packet transmission rate within each microburst to increase from zero and gradually increase to a maximum governed by the available bandwidth. As a result, the actual microburst duration Bi is not fixed. Alternatively, the connection may also use another protocol for transmitting the data packets of each microburst. Using the other protocol, i.e. a protocol without feedback constraints, allows the data packets in each burst to be continuous and be transmitted using the full bandwidth of the transmission channel.

Following the transmission of the last packet of each microburst 410, the TCP connection may be kept open while no packets are sent. As a result, the wireless base station 106 will time out after a minimum hold-over period "To" and release the wireless broadband channel 114 to the mobile unit 110, to ensure the wireless broadband channel becomes free for other uses between bursts. This leaves a remaining period "Tr" in each throttling window 408, a period in which the wireless base station 106 is able to use the freed-up wireless broadband channel otherwise, for example assign it to another mobile unit. The sum of the hold-over period "To" and the remaining period "Tr" in each window is considered as an idle time in which the wireless broadband channel is available for other traffic. Preferably, the idle time is substantially longer than the microburst duration Bi and the minimum hold-over period "To", at the very least longer than 2-10 hold-over periods "To", or even longer in order to allow for other traffic to take advantage of the remaining period "Tr".

While the window period should be selected long enough to allow a sufficiently long idle time, so that it is substantially longer than the minimum hold-over period, the length of the window period is also limited by the following considerations:

The length of the window period is directly proportional to the number of packets "P" in each microburst. It is assumed that the ultimate receiver of the microbursts, i.e. the mobile unit 110 or specifically the video decoder in the mobile unit 110, has sufficient buffer capacity to smooth the received microburst packets into the required real time video sequence. Therefore, the selection of the window period should be based on an expected reasonable buffer capacity in the receiver receiving the media file.

The internet connection 206 will time out after a connection timeout value which is associated with the protocol used for transmitting the data packets. This connection timeout value is expected to be quite long in a typical system, on the order of several seconds, but future high speed systems may consider protocols with shorter connection timeout values. The window period should not be longer than the connection timeout.

Another reason for restricting the length of the window period is the absolute added delay that is caused by the packet buffer 318. This delay which is added to any transmission delay from the media server 102 to the receiver, i.e. the mobile unit 110, corresponds to the time represented by packets having arrived from the media server 102 in the packet buffer 318, but waiting for the next microburst to be sent on to the mobile unit 110. For ordinary one-way delivery of media files for real time viewing for example, this added delay may not be of concern. It may be of concern with interactive media or two-way video, and becomes another reason not to make the window period too long.

In effect, the wireless broadband channel may be considered to be similar to an Ethernet local network bus in some respects. For example, the wireless broadband channel by virtue of the micro-bursting technique, disclosed in the present invention, allows dynamic timesharing of a single wireless broadband channel for providing simultaneous media delivery to multiple mobile units. For example, according to embodiments of the invention, the idle time is intended to be sufficiently large to permit another burst associated with another media file, to be sent in the same window period.

It is noted that the wireless base station 106 may be constructed according to any standard which provides a wireless broadband channel supporting the Internet Protocol (IP). Applicable standards include wireless Second Generation (2G), Third Generation (3G) and Fourth Generation (4G) networks standards, Long Term Evolution (LTE), LTE Advanced, Worldwide Interoperability for Microwave Access (WiMAX) and Wi-Fi for example.

It is further noted that a system for distributing media files over a broadband wireless channel over a satellite using microbursts according to embodiments of the invention should be considered to be within the scope of the invention.

Figure 4A:
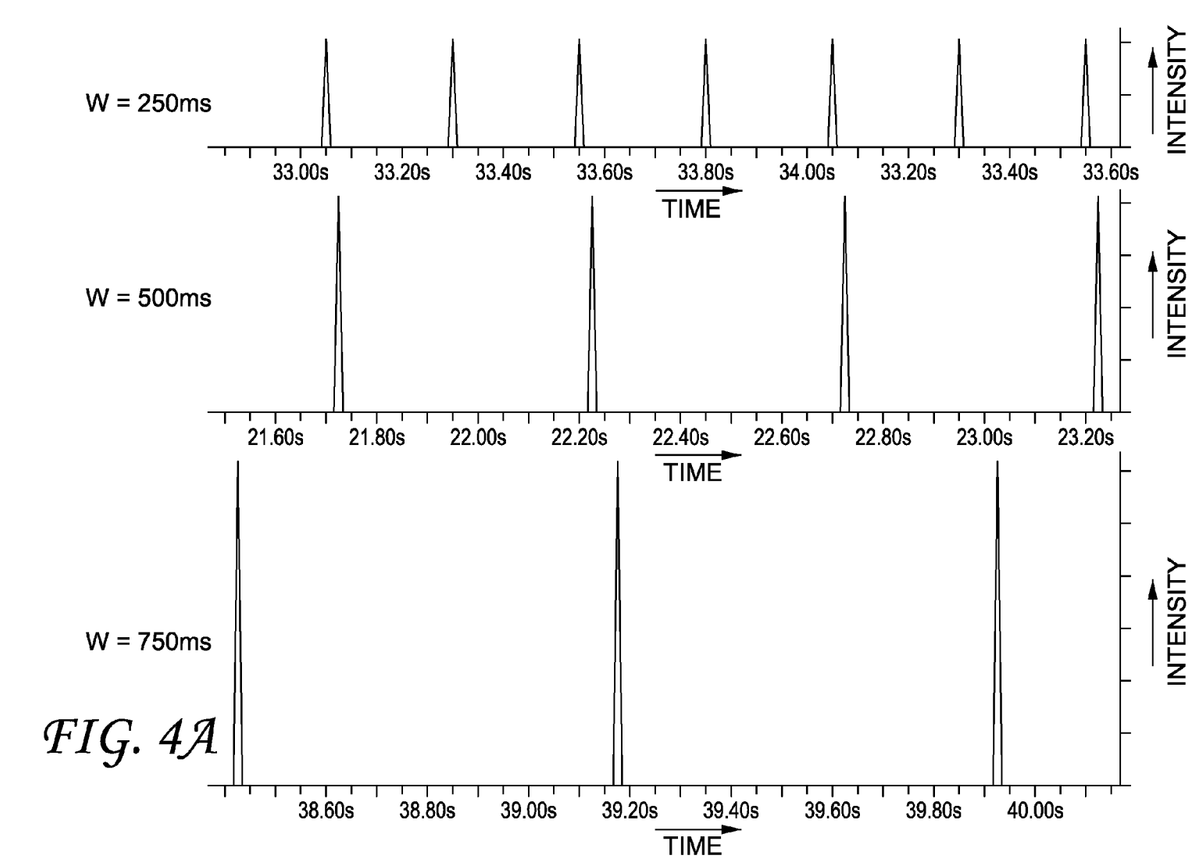
FIG. 4A shows simulation traces indicating packet transmission intensity for microbursts for various window periods "W" according to embodiments of the invention.

FIG. 4A shows simulation traces indicating packet transmission intensity for microbursts corresponding to window period settings of W=250 ms, W=500 ms, and W=750 ms. The triangular shape of each microburst pulse is due to the standard starting and re-starting behavior of the TCP connection with respect to traffic intensity. The height of each peak reflects an arbitrary intensity measure in terms of packets per millisecond, and depends on both, the network capacity and the window period, where a longer window period results in a higher intensity. This reflects the fact that the TCP connection has to ramp up in each window period and so will reach a higher peak for a longer microburst, a longer microburst being needed to transfer a larger number of packets ("P") in each window when "W" is larger, to achieve the same average packet rate.

Figure 5:
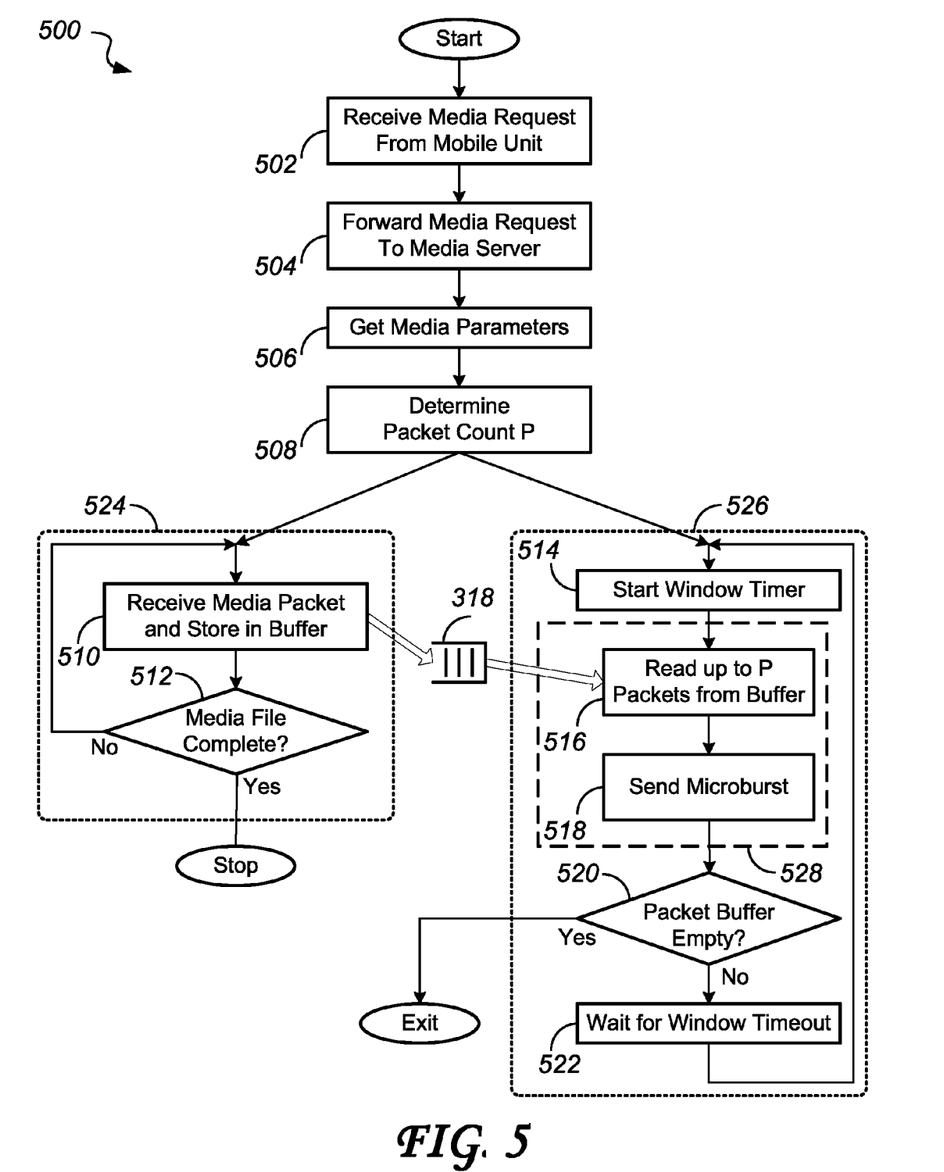
FIG. 5 is a flow chart of a micro-bursting method 500 according to an embodiment of the invention.

FIG. 5 is a flow chart of a micro-bursting method 500, showing steps in sending a media file over a micro-bursted broadband channel according to an embodiment of the invention, including:

step 502: "Receive Media Request From Mobile Unit";
step 504: "Forward Media Request To Media Server";
step 506: "Get Media Parameters";
step 508: "Determine Packet Count P";
step 510: "Receive Media Packet and Store in Buffer";
step 512: "Is Media File complete?";
step 514: "Start Window Timer";
step 516: "Read up to P Packets from Buffer";
step 518: "Send Microburst";
step 520: "Is Packet Buffer Empty?"; and
step 522: "Wait for Window Timeout".

The micro-bursting method 500 may be executed in the Microburst Gateway 202 of FIG. 2 and according to the microburst process 306 of FIG. 3.

After a media request for a media file in a media server, for example for the Media File 324 in the Media Server 102, is generated by a mobile unit, for example the mobile unit 110, and relayed by the Wireless Base Station 106 to the Microburst Gateway 202, the request is registered in the microburst process 306 in the step 502 "Receive Media Request From Mobile Unit". This includes establishing a TCP connection between the mobile unit and the Microburst Gateway 202 over the internet link 206.

In the step 504 "Forward Media Request To Media Server", the media request is forwarded to the media server concerned, and a second TCP connection, over the media link 204 between the Microburst Gateway 202 and the media server is established. From this point on, information can be exchanged between the mobile unit and the media server, whereby the Microburst Gateway 202 acts as a proxy.

In the step 506 "Get Media Parameters", media parameters which are exchanged between mobile unit and the media server are monitored in the Microburst Gateway 202, specifically to obtain the average bandwidth "A" required to stream the requested media in real time.

In the step 508 "Determine Packet Count P", the packet count "P" to be used in micro-bursting is calculated as a function of the average bandwidth "A" and the window period "W". The window period "W" may have been configured as a constant value, for example 500 ms, or optionally be determined within a range from about 200 ms to 1000 ms, as a function of network conditions associated with the properties of the links to one or both, of the mobile unit and the media server.

From this point on, two loops are executed concurrently: A receiving loop 524, comprising the steps 510 and 512 required to receive all media packets representing the media file sent by the media server over the link 204; and a micro-bursting loop 526 comprising the steps 514 to 522 in which the received packets are transmitted to the wireless base station over the link 206 and thereby to the mobile unit.

In the step 510 "Receive Media Packet and Store in Buffer", one received media packet is stored in the Packet Buffer 318.

In the step 512 "Is Media File complete?", it is determined if the complete file has been received. If it has not yet completely been received (exit NO from the step 512) the execution continues with the step 510, otherwise (exit YES from the step 512) the receiving loop 524 is stopped. However, the concurrent micro-bursting loop 526 continues to send the media packets until the packet buffer 318 is empty.

In the step 514 "Start Window Timer", the Window Timer 312 is started to time a new window period "W".

In the step 516 "Read up to P Packets from Buffer", a number "P" of media packets is read from the Packet Buffer 318 to form a microburst 410 of "P" packets, see FIG. 4. If at least one, but less than "P" packets are available in the packet buffer, the media file may be almost complete. In that case, the available less than "P" packets are read in the step 516 and sent in the next step In the step 518 "Send Microburst", the microburst 410 is transmitted to the wireless base station over the link 206 and thereby to the mobile unit.

Figure 6:
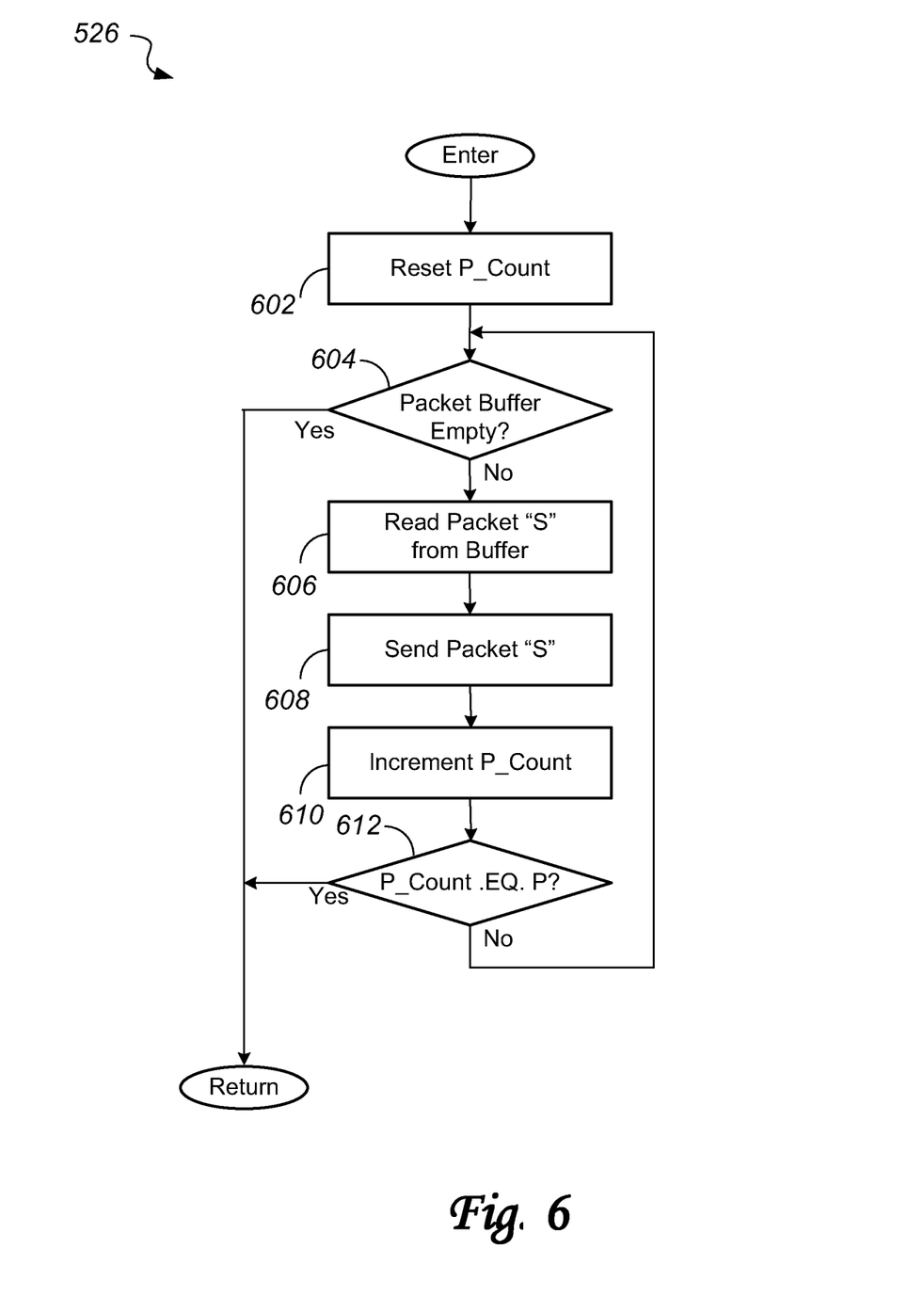
FIG. 6 shows an expanded flowchart of the subroutine 528 "Send Microburst from Buffer" of FIG. 5.

In an alternative embodiment of the invention, the steps 516 and 518 may be replaced a subroutine 528 "Send Microburst from Buffer" which is expanded in FIG. 6.

FIG. 6 shows an expanded flowchart of the subroutine 528 "Send Microburst from Buffer", including:

step 602: "Reset P_Count";
step 604: "Is Packet Buffer Empty?";
step 606: "Read one Packet from Buffer";
step 608: "Send one Packet";
step 610: "Increment_P_Count"; and
step 612: "Is P_Count equal P".

Through subroutine 528 "Send Microburst from Buffer", a single microburst is sent directly from the packet buffer, one packet at a time while keeping track of the packets that have been sent in the microburst, in a packet counter. Depending on the type of network API (Application Programming Interface) of the Network Protocol Interface 322, this method may be more efficient than the pair of steps 516 and 518 above which may be implemented by first copying a block of "P" packets from the Packet Buffer 318 into a temporary memory block that may be associated with the network API (step 516), and then sending the entire block of "P" packets out (step 518).

Other implementations for transmitting a microburst from the packet buffer to the internet link 206, that is variations of the steps 516+518, or equivalently the subroutine 528, may occur to those skilled in the art, and are within the scope of the invention.

In the step 602 "Reset P_Count", a packet counter, for example the Packet Counter 314 (FIG. 3) is reset to zero.

The steps 604 to 612 constitute a loop, each iteration of which serves to send a single packet from the packet buffer to the internet link 206

In the step 604 "Is Packet Buffer Empty?", it is determined if the packet buffer is empty. This may occur, for example, at the end of the media file, when the total number of packets in the media file is not an integer multiple of the microburst size "P". If the packet buffer is empty (exit YES from the step 604), the subroutine 528 returns, otherwise (exit NO from the step 604) execution continues with the next step 606.

In the step 606 "Read one Packet from Buffer", a single packet "S" is read from the Packet Buffer 318, and in the step 608 "Reset P_Count", this packet "S" is transmitted.

In the step 610 "Increment P_Count", the packet counter is incremented to account for the packet "S" that was sent.

In the step 612 "Is P_Count equal P", it is determined if the packet count has reached "P". If it has reached "P" (exit YES from the step 612) the microburst is complete and the subroutine 528 returns, otherwise (exit NO from the step 612) additional packet(s) are to be sent, and the loop execution continues from the step 604.

Attention is now drawn back to FIG. 5.

In the step 520 "Is Packet Buffer Empty?", it is determined if the packet buffer is empty. If the packet buffer is empty, this means that there are no more packets available because the entire media file has been sent to the mobile unit. In that case (exit YES from the step 520), the micro-bursting method 500 is finished and exits, otherwise (exit NO from the step 520) execution continues with the next step 522.

In the step 522 "Wait for Window Timeout", the Window Timer 312 continues to count down. When the timer expires, i.e. times out, the step 522 ends and execution continues with the step 514, that is another iteration of the micro-bursting loop 526 is started.

The micro-bursting method 500 of FIG. 5 is designed to begin transmitting microbursts to the mobile unit as soon as the start of the media file is received and continue sending microbursts concurrently with receiving media file packets from the media server. This assumes that the pace of streaming of packets from the media server is at least as high as the average bandwidth "A" required to stream the requested media in real time. But if the arrival rate of packets from the media server is insufficient, this could have an undesirable side effect in not having sufficient packets, that is less than "P" packets available for micro-bursting in each window period "W". To avoid this, a minimum number of "P" packets or more may be accumulated in the packet buffer before sending the first microburst.

In an alternative embodiment, the entire media file may be received and stored in the packet buffer 318, before transmission to the mobile unit is begun.

In the embodiments of the invention described above, micro busts have been sent with predetermined periodicity associated with the duration of the window period. It is contemplated that different window periods may have different durations, and micro bursts may be sent not necessarily strictly periodically, as required.

While the description of the embodiment has been with regards to a wireless application of media downloading to mobile units, it should be clear that this application of the invention is only an example. The proposed method of pacing a download by means of microbursts may equally have validity in related fields, for example, where a broadband channel is provided by optical means, and a packet transmission may be paced using microbursts in larger windows.

What is claimed is:

1. A method for transmitting a first and a second media file via a wireless base station to a first and second destination respectively over a broadband channel having excess bandwidth, the method comprising:
(a) establishing first and second data connections to the first and second destinations respectively through the wireless base station;
(b) sending a part of the first media file in a burst of data packets to the wireless base station over the first data connection at a higher than a first average packet rate, the first average packet rate corresponding to a first average bandwidth required for transmitting the first media file;
(c) at the wireless base station:
allocating the broadband channel to the first data connection;
forwarding the burst of data packets to the first destination over the broadband channel; and
releasing the broadband channel following the forwarding of the burst, after a
hold-over period;
(d) sending a part of the second media file in another burst of data packets to the wireless base station over the second data connection at a higher than a second average packet rate, the second average packet rate corresponding to a second average bandwidth required for transmitting the second media file;
(e) at the wireless base station:
allocating the broadband channel to the second data connection;
forwarding the another burst of data packets to the second destination over the broadband channel; and releasing the broadband channel following the forwarding of the another burst, after another hold-over period; and (f) repeatedly performing the steps (b) to (e) in a throttling window until the first and second media files have been sent; wherein a duration of a window period W for the throttling window is designed to be sufficient to accommodate at least a sum the burst of data packets, the hold-over period, the another burst of data packets, and the another hold-over period.

2. The method of claim 1, wherein the duration of the window period W further comprises a remaining period.

3. The method of claim 1, wherein the duration of the window period W is further limited by a buffer capacity in a receiver receiving one of the first or the second media file.

4. The method of claim 1, wherein the duration of the window period W is further limited by a desired maximum delay for a real time delivery of one of the first or the second media file to the receiver.

5. The method of claim 2, wherein the duration of the window period W is further limited by being selected so that the remaining period is substantially longer than the hold-over period.

6. The method of claim 1, wherein the duration of the window period W is further limited by a connection timeout value associated with a protocol used for transmitting one of the burst of data packets or the another burst of data packets.

7. The method of claim 1, wherein the hold-over period is a minimum hold-over period of about 10 ms, and the duration of the window period W is in a range from about 100 ms to about 1000 ms.

8. The method of claim 1, wherein the data packets in each burst are protocol data units of a standard transmission protocol.

9. The method of claim 8, wherein:
the standard transmission protocol is the Transmission Control Protocol (TCP);
the first and second data connections are TCP connections; and
the window period W is shorter than a connection timeout value of either of the TCP connections.

10. The method of claim 1, wherein:
the destination is a mobile device; and
the broadband channel is a wireless broadband channel according to a wireless standard for mobile users.

11. The method of claim 10, wherein the wireless standard is one of Second Generation (2G), Third Generation (3G), Fourth Generation (4G) networks standards, Long Term Evolution (LTE), LTE Advanced, Worldwide Interoperability for Microwave Access (WiMAX), and Wi-Fi.

12. The method of claim 1, further comprising sending the first and a second media files to the wireless base station over an Internet connection.

13. A microburst gateway for transmitting a first and a second media file via a wireless base station, the wireless base station forwarding the first and second media files to a first and second destination respectively over a broadband channel having excess bandwidth, the microburst gateway comprising:

a processor and a computer readable storage medium having computer readable instructions stored thereon for execution by the processor, the processor being configured to:
(a) establish first and second data connections to the first and second destinations respectively;

(b) send a part of the first media file in a burst of data packets to the wireless base station over the first data connection at a higher than a first average packet rate, the first average packet rate corresponding to a first average bandwidth required for transmitting the first media file;

(c) communicate with the wireless base station configured to:
allocate the broadband channel to the first data connection;
forward the burst of data packets to the first destination over the broadband channel; and
release the broadband channel following the forwarding of the burst, after a
hold-over period;

(d) send a part of the second media file in another burst of data packets to the wireless base station over the second data connection at a higher than a second average packet rate, the second average packet rate corresponding to a second average bandwidth required for transmitting the second media file;

(e) communicate with the wireless base station configured to:
allocate the broadband channel to the second data connection;
forward the another burst of data packets to the second destination over the broadband channel; and
release the broadband channel following the forwarding of the another burst, after another hold-over period; and (f) repeatedly perform the steps (b) to (e) in a throttling window until the first and second media files have been sent; wherein a duration of a window period W for the throttling window is designed to be sufficient to accommodate at least a sum of the burst of data packets, the hold-over period, the another burst of data packets, and the another hold-over period.

14. The microburst gateway of claim 13, wherein the duration of the window period W further comprises a remaining period.

15. The microburst gateway of claim 13, wherein the duration of the window period W is further limited by a buffer capacity in a receiver receiving one of the first or the second media file.

16. The method of claim 13, wherein the duration of the window period W is further limited by a desired maximum delay for a real time delivery of one of the first or the second media file to the receiver.

17. The method of claim 14, wherein the duration of the window period W is further limited by being selected so that the remaining period is substantially longer than the hold-over period.

18. The method of claim 13, wherein the duration of the window period W is further limited by a connection timeout value associated with a protocol used for transmitting bursts of data packets.

19. The microburst gateway of claim 13, wherein the hold-over period "To" is a minimum hold-over period of about 10 ms, and the duration of the window period W is in a range from about 100 ms to about 1000 ms.

20. The microburst gateway of claim 13, wherein the data packets in each burst are protocol data units of a standard transmission protocol.

21. The microburst gateway of claim 20, wherein:
the standard transmission protocol is the Transmission Control Protocol (TCP);

the first and second data connections are TCP connections; and the window period W is shorter than a connection timeout value of either of the TCP connections.

22. The microburst gateway of claim 13, wherein:
the destination is a mobile device; and
the broadband channel is a wireless broadband channel according to a wireless standard for mobile users.

23. The microburst gateway of claim 22, wherein the wireless standard is one of Second Generation (2G), Third Generation (3G), Fourth Generation (4G) networks standards, Long Term Evolution (LTE), LTE Advanced, Worldwide Interoperability for Microwave Access (WiMAX), and Wi-Fi.

24. The microburst gateway of claim 13, wherein the first and a second media files are sent to the wireless base station over an Internet connection.

25. A system for transmitting a first and a second media file to a first and second destination respectively over a broadband channel having excess bandwidth, the system comprising:
a wireless base station for forwarding the first and second media files over the broadband channel; and
a microburst gateway comprising:
a processor and a computer readable storage medium having computer readable instructions stored thereon for execution by the processor, the processor being configured to:
(a) establish first and second data connections to the first and second destinations respectively;
(b) send a part of the first media file in a burst of data packets to the wireless base station over the first data connection at a higher than a first average packet rate, the first average packet rate corresponding to a first average bandwidth required for transmitting the first media file;
(c) communicate with the wireless base station configured to:
allocate the broadband channel to the first data connection;
forward the burst of data packets to the first destination over the broadband channel; and
release the broadband channel following the forwarding of the burst, after a hold-over period;
(d) send a part of the second media file in another burst of data packets to the wireless base station over the second data connection at a higher than a second average packet rate, the second average packet rate corresponding to a second average bandwidth required for transmitting the second media file;
(e) communicate with the wireless base station configured to:
allocate the broadband channel to the second data connection;
forward the another burst of data packets to the second destination over the broadband channel; and
release the broadband channel following the forwarding of the another burst, after another hold-over period; and
(f) repeatedly perform the steps (b) to (e) in a throttling window until the first and second media files have been sent; wherein a duration of a window period W for the throttling window is designed to be sufficient to accommodate at least a sum of the burst of data packets, the hold-over period, the another burst of data packets, and the another hold-over period.

26. The system of claim 25, wherein the duration of the window period W further comprises a remaining period.

27. The system of claim 25, wherein the duration of the window period W is further limited by a buffer capacity in a receiver receiving one of the first or the second media file.

28. The method of claim 25, wherein the duration of the window period W is further limited by a desired maximum delay for a real time delivery of one of the first or the second media file to the receiver.

29. The method of claim 26, wherein the duration of the window period W is further limited by being selected so that the remaining period is substantially longer than the hold-over period.

30. The method of claim 25, wherein the duration of the window period W is further limited by a connection timeout value associated with a protocol used for transmitting bursts of data packets.

31. The system of claim 25, wherein the hold-over period is a minimum hold-over period of about 10 ms, and the duration of the window period W is in a range from about 100 ms to about 1000 ms.

32. The system of claim 25, wherein the data packets in each burst are protocol data units of a standard transmission protocol.

33. The system of claim 32, wherein:
the standard transmission protocol is the Transmission Control Protocol (TCP);
the first and second data connections are TCP connections; and
the window period W is shorter than a connection timeout value of either of the TCP connections.

34. The system of claim 25, wherein:
the destination is a mobile device; and
the broadband channel is a wireless broadband channel according to a wireless standard for mobile users.

35. The system of claim 34, wherein the wireless standard is one of Second Generation (2G), Third Generation (3G), Fourth Generation (4G) networks standards, Long Term Evolution (LTE), LTE Advanced, Worldwide Interoperability for Microwave Access (WiMAX), and Wi-Fi.

* * * * *